March 8, 1938.  H. F. FLOWERS  2,110,213
ROAD VEHICLE SYSTEM WITH POWER STEERING MECHANISM
Filed April 18, 1934    6 Sheets-Sheet 1

Inventor,
Henry Fort Flowers.
By Sturtevant & Mason
Attorneys

Patented Mar. 8, 1938

2,110,213

UNITED STATES PATENT OFFICE 2,110,213

ROAD VEHICLE SYSTEM WITH POWER STEERING MECHANISM

Henry Fort Flowers, Findlay, Ohio

Application April 18, 1934, Serial No. 721,234

10 Claims. (Cl. 180—79.2)

This invention relates to a road vehicle system having power steering mechanism for controlling the angular direction of movement of the vehicle system.

One of the features of the present invention is the provision of separate trucks which are independently mounted for steering movement, together with means for effecting the steering movement of such trucks from a source of power, the direction and amount of such movement being controlled through manually operable means.

Still another feature of the present invention is the provision of a tractor vehicle adapted for employment with a trailer vehicle, each of these vehicles being provided with a plurality of independently pivoted trucks, together with means for controlling the trucks at the adjacent ends of the vehicles in unison, and means for controlling the trucks at the remote ends of the vehicles at the will of the driver.

With these and other objects in view as will appear in the course of the following specification and claims, an illustrative form of construction is set forth on the accompanying drawings, in which:

Certain features disclosed with respect to the provision of the truck mountings including resilient and cushioning devices, are likewise disclosed and are claimed in my divisional application Serial No. 44,777, filed October 12, 1935.

In the drawings, the invention is shown as applied to the vehicles of a train for road transport comprising a motor or tractor vehicle and a plurality of (here two) trailer vehicles. These vehicles may be employed with bodies of various types, but are illustrated in Figures 2, 6, 8 and 9 as having dump bodies and associated parts so that the dump bodies may operate by lateral tilting for the discharge of the lading. Each vehicle is illustrated as provided with four separate and independent trucks, each of which has an independent vertical pivot about which it may turn for steering, and each also being adapted for pivoting at an intermediate point of its length about a horizontal axis which is substantially transverse to the vehicle while the latter is traveling straight-away. Each truck is illustrated as having two longitudinally spaced transverse axles each having two road wheels. The motor plant or source of power on the tractor vehicle is illustrated as connected to all trucks of both tractor and trailer vehicles, so that it will operate to drive all wheels of the vehicle train. The pairs of trucks at opposite sides of the vehicle system are connected together mechanically by tie rods so that they swing together through corresponding but dissimilar arcs whereby their wheels will move along concentric circles while the vehicle is turning a curve. A power steering system (illustrated and referred to as manually controlled) is provided for moving the trucks of the vehicle train, e. g., the front trucks of the motor vehicle and the rear trucks of the last trailer vehicle in the train shown in Figure 1. All trucks may be actuated and/or controlled from the power steering system, but selector means are also provided so that the intermediate trucks, or those other than the front and rear trucks of the train, may be disconnected from the power system. The pairs of intermediate trucks of the train, e. g., the rear trucks of the motor vehicle and the front trucks of the adjacent trailer vehicle, at least, are connectable to and operable by a coupling system so that adjacent pairs are mechanically operated in conjunction to move through arcs which result in the wheels of one vehicle properly following the corresponding wheels of the other vehicle.

Further, the supports for the trucks, providing the aforesaid vertical pivots thereof, are so devised as to permit the employment of air cushions for relieving the supporting springs and for operating to level the vehicle body by raising it at one or the other side.

In the illustrated form, the weight of the body is supported directly upon the tops of the vertical pivot and cushioning means so that other parts of the frame are not subject to heavy strains, and are not called upon to operate as beams in transferring such loads in horizontal directions; and thus the body weight is transmitted directly to the trucks and wheels and a light frame is sufficient for a body of large carrying capacity. The wheels, furthermore, are so spaced and separated by employing four at each corner of the vehicle, by providing each four in two laterally spaced pairs, and by laterally spacing the wheels of each such pair from one another, that the load on each wheel may be substantially equalized with respect to all others, and is low; and the said spacings and separation reduce the tendency of any wheel or pair of wheels to sink into mud or break through the surface of the roadway, as the total ground area covered is large and this area is not locally strained to an excessive degree.

The coupling system employed between vehicles of the train is illustrated as including coupling elements which are secured to the individual vehicles and comprise symmetrical or universal coupling heads so that the trailer vehicles may be coupled together and to the tractor either end to. These coupling elements may include within themselves the necessary drive and control connections for establishing the aforesaid drive of the wheels, the braking of the same, the steering of the trucks, and the movement of the vehicle body for dumping.

In Figures 1, 2, 3 and 4, the tractor vehicle is illustrated as having a cab C at its front end for housing both an engine E and a driver who occupies the seat D, for example. Longitudinal frame members 10 are provided in both tractor and trailer vehicles, with cross members 11 for supporting the cushion cylinders 12 which are provided with piston structures and with head members 124 for supporting the dump body for tilting laterally. The four trucks Fr, Fl, Rr, Rl for the front and rear of each vehicle are connected independently to the corresponding piston structures at the four corners of each vehicle, as will be described in detail hereinafter. Each of these trucks is provided with four wheels which are mounted in pairs on common axes. The trucks at opposite sides of each vehicle are connected by tie rods 15, which illustratively are shorter between their pivotal points of connection to the trucks than the distance between the corresponding upright truck pivots at the cylinders 12 and are located at the ends of the trucks nearer the center of length of the vehicle. In the tractor vehicle, auxiliary frame members 10a are extended forwardly for supporting the cab C, an engine E, and other structures peculiar to the tractor vehicle.

The motor E of the tractor vehicle is connected (Figure 4) by a drive shaft 20 to a clutch 21 and a change-speed transmission 22 and thence by a drive shaft 23 which passes through and energizes the main differential 24 of the tractor vehicle, and also through the coupling shafts 26 forming part of the coupling elements 32 (to be described hereinafter), with the main shaft 23 of the next trailer vehicle (Figure 4a) and thus with the main differential 24 of this trailer vehicle, and also with a coupling shaft 26 in the rear coupling element 32 of this trailer vehicle. Thus the single engine E drives the two main differentials 24 of the two vehicles illustrated in Figures 4 and 4a, and in general drives the main differentials of all vehicles connected in train. Each of these vehicles is provided with transversely extending shafts within the housings 25 which connect the main differential 24 thereof with the lateral differentials Dr and Dl, which in turn actuate longitudinally extending shaft members which are connected by aligned universal joints 29, telescoping truck-driving shafts 30, and universal joints 31 with drive mechanism located within the individual trucks, which will be described in further detail with reference to Figures 8 and 9. By this means, a constant drive is assured from the engine to each vehicle, and ultimately to each wheel of each truck thereof. By having the lateral differentials Dr, Dl located substantially in the lateral vertical longitudinal planes of the vertical truck pivots, the movements of the corresponding universal joints 31 will be to either side of this plane during steering movements of the trucks, and hence the extension movements of the telescoping drive shafts 30, and the movements of the universal joints 29, 31 in a horizontal plane, are reduced to a minimum. In this same connection, it may be pointed out that the provision of horizontal pivots for each truck whereby the truck is adapted to rock about an axis substantially parallel to the axes of its pairs of wheels during travel over uneven terrain causes, likewise, telescoping movements of the shafts 30 and pivotal movements of the universals 29 and 31 of limited extent. Each coupling shaft 26 is located within a composite tubular housing 32 which is mounted at its ends for pivotal movement at elements 33 of the tractor or trailer vehicles whereby a coupling link is provided between the vehicles for haulage and pushing forces.

Figure 1:
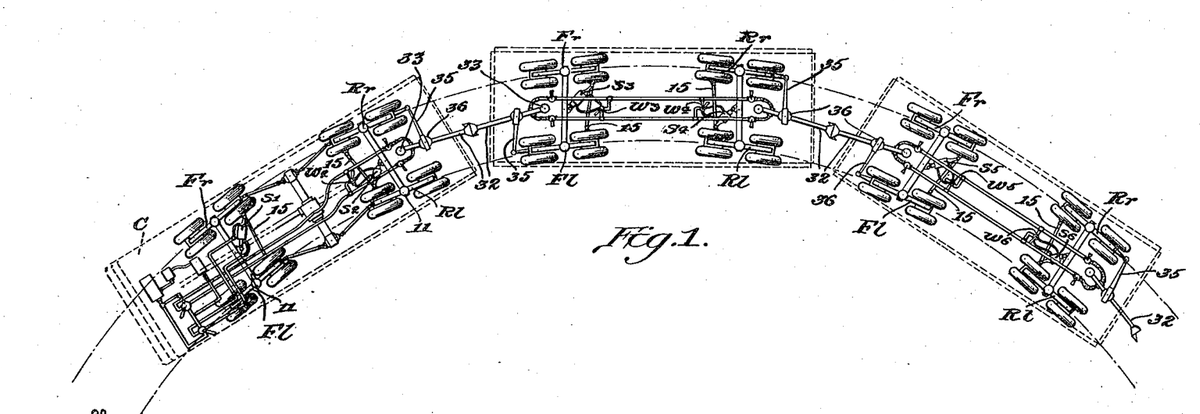
Figure 1 is a diagrammatic plan view showing the relationship and interconnection of tractor and trailer vehicles in the vehicle train, with their separate trucks and wheels and the supporting connections thereto, parts being omitted for clearness.
Figure 2:
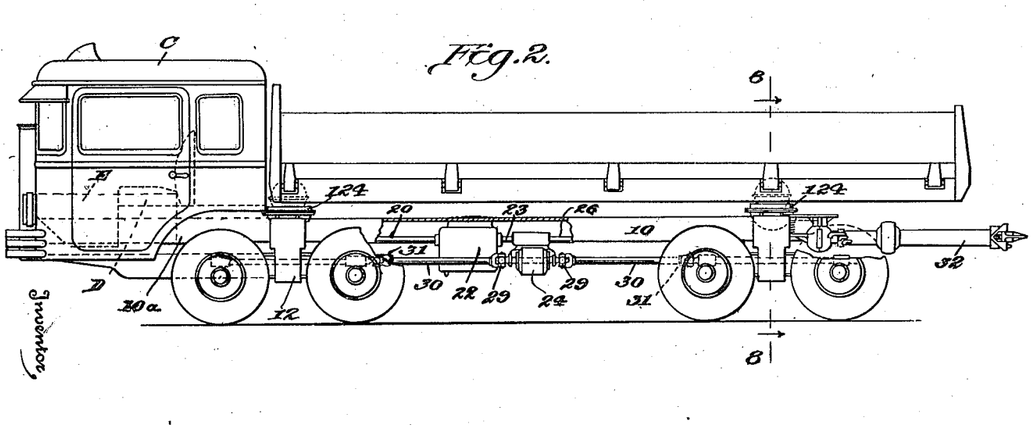
Figure 2 is a side elevation, on a larger scale, of a tractor vehicle.
Figure 4:
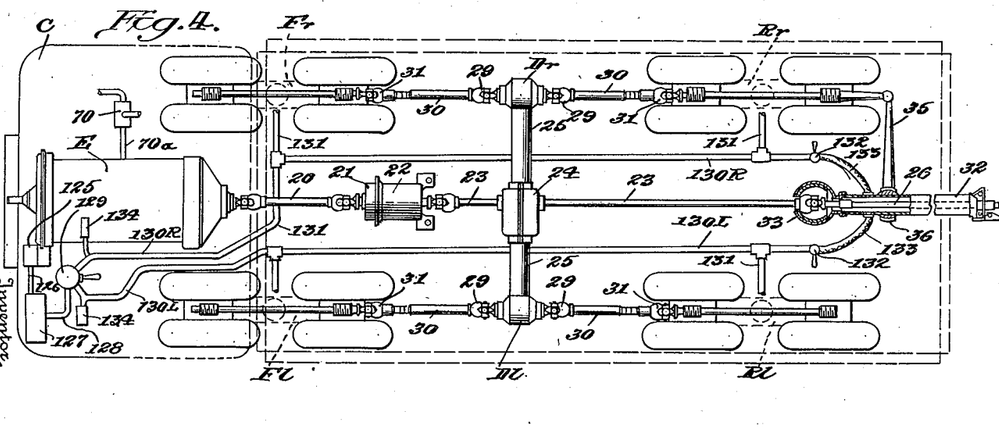
Figures 4 and 4a are diagrammatic plan views, on the scale of Figure 3, and showing the driving and cushioning connections of a tractor and a trailer vehicle, other parts being omitted for clearness.
Figure 4A:
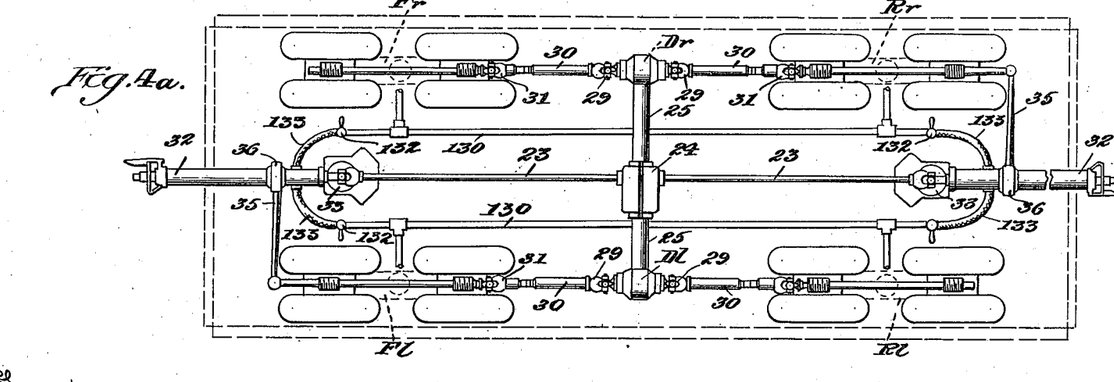

As shown in Figures 1, 4 and 4a, the right-hand rear truck Rr of each vehicle is connected by a link 35 with a ball joint 36 on the coupling housing 32, located at a point removed from the center 33 of oscillation of this housing with respect to this vehicle. A similar link 35 is connected to the left-hand front truck Fl of the next succeeding vehicle in each instance, and also to a ball joint 36 on the coupling housing 32 at a point thereof removed from the pivot connection 33 of this tube on this succeeding vehicle. Thus, in normal operation as the tractor vehicle tends to depart from the straight-away, by reason of movement of its front end to one or the other side of the straight-away, the coupling housing 32 mechanically causes successive movements of the rear trucks of all but the last trailer vehicle, and of the front trucks of all but the tractor vehicle, so that the wheels of the successive trucks tend to follow one another on the curved paths illustrated by the dot-and-dash lines in Figure 1. This effect is produced through the tie rods 15 connecting the trucks at opposite sides of each vehicle.

It will be noted that the design of the several trucks is substantially identical in both the tractor and trailer vehicles, and that the trailer vehicles are preferably fully symmetrical so that each trailer may be coupled at either of its ends to a tractor or to another trailer.

Figure 5:
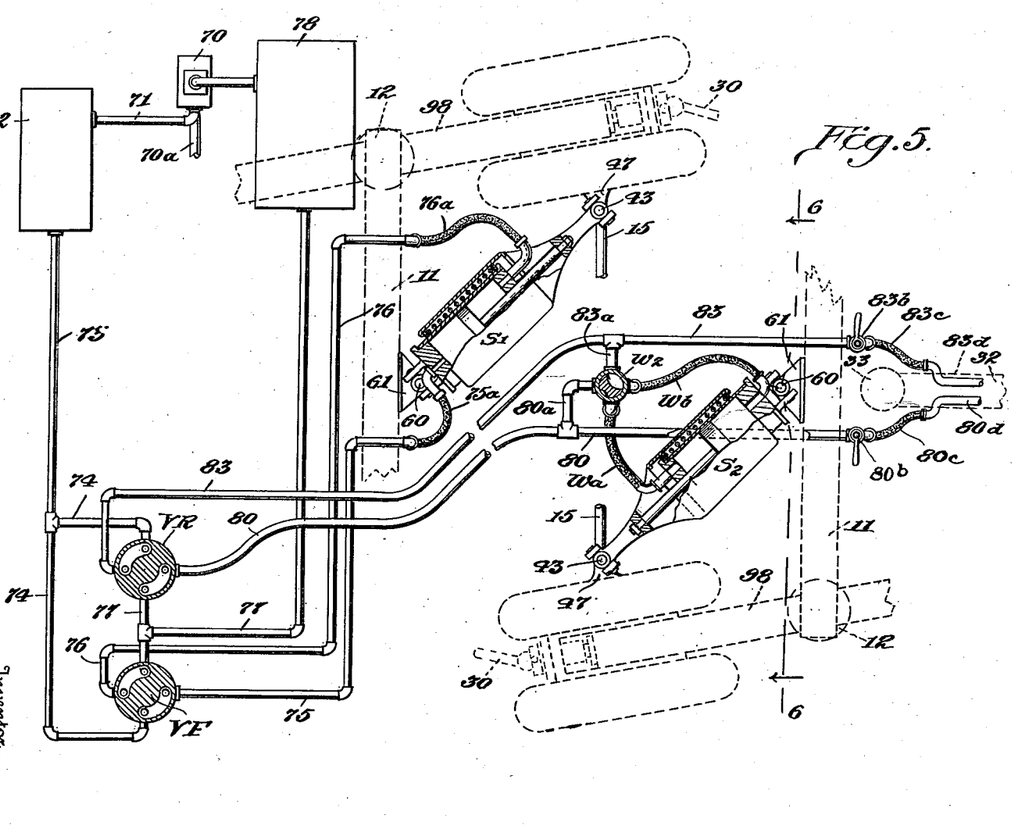
Figure 5 is a view, on a much larger scale, showing the pipe and mechanical connections for the illustrated steering control system.

Each pair of trucks is likewise adapted for maneuvering by the power steering devices S1, S2, S3, S4, S5, S6 (Figures 1, 3 and 5) which each comprise means for causing a rocking movement of a truck about its vertical pivot at 12. Each of these devices is illustrated at S, in Figures 6, 7 and 7a, as being a fluid-actuated cylinder-and-piston structure which is caused to extend or telescope according to the admission of fluid thereto. Each device is connected at one end to the frame of the corresponding vehicle at a point located substantially in the central vertical longitudinal plane of the vehicle, and at its other end is joined to a truck substantially at the point of connection of the corresponding tie rod 15.

Each of these devices is illustrated as constructed (Figures 5, 6, 7 and 7a) of an outer housing structure 40 having spaced inwardly extending flanges 41, 41a and extensions 42 at one end for engaging the ends 43 of a universal pivot for these arms 42 and for the bifurcated end 44 of the bifurcated tie rod 15. The ends 45 of the universal pivot connect it to a bracket 47 on a plate 45a (Fig. 6) fixed to a flange member 45b which is supported by antifriction bearings 45c with respect to the nut member 107a which secures the corresponding wheel upon its axle stub; this arrangement operating to connect the tie rod to a wheel axle, while permitting free rotation of the wheel axle with respect to the tie rod. Thus, the tie rod and the power steering unit may make universal movements with respect to the truck structure. Within the housing 40 and bearing against the internal flanges 41, 41a thereof are the pressure rings 48, 49 which receive the ends of a coil spring 50. A sleeve 51 defines an annular chamber in conjunction with the housing 40 for reception of the spring 50, and also provides an internal cylindrical wall surface for cooperation with the piston 52 which has a piston rod 53 connected at its outer end with a bracket 54 joining the two arms 42. The piston 52 and housing 40 move together at all times. The piston rod 53 extends through a closing plug 55 which is fixed to the sleeve 51 for closing one end of the cylinder and for engaging pressure ring 48; while a similar closing plug 56 is likewise located at the other end of the cylinder and is engageable with pressure ring 49, and is provided with ears 57 for receiving a pivot 58 which joins it to the body 59 of a universal joint having a vertical pivot 60 mounted in the arms 61 of a vehicle frame member.

Figures 6, 7, 7A:
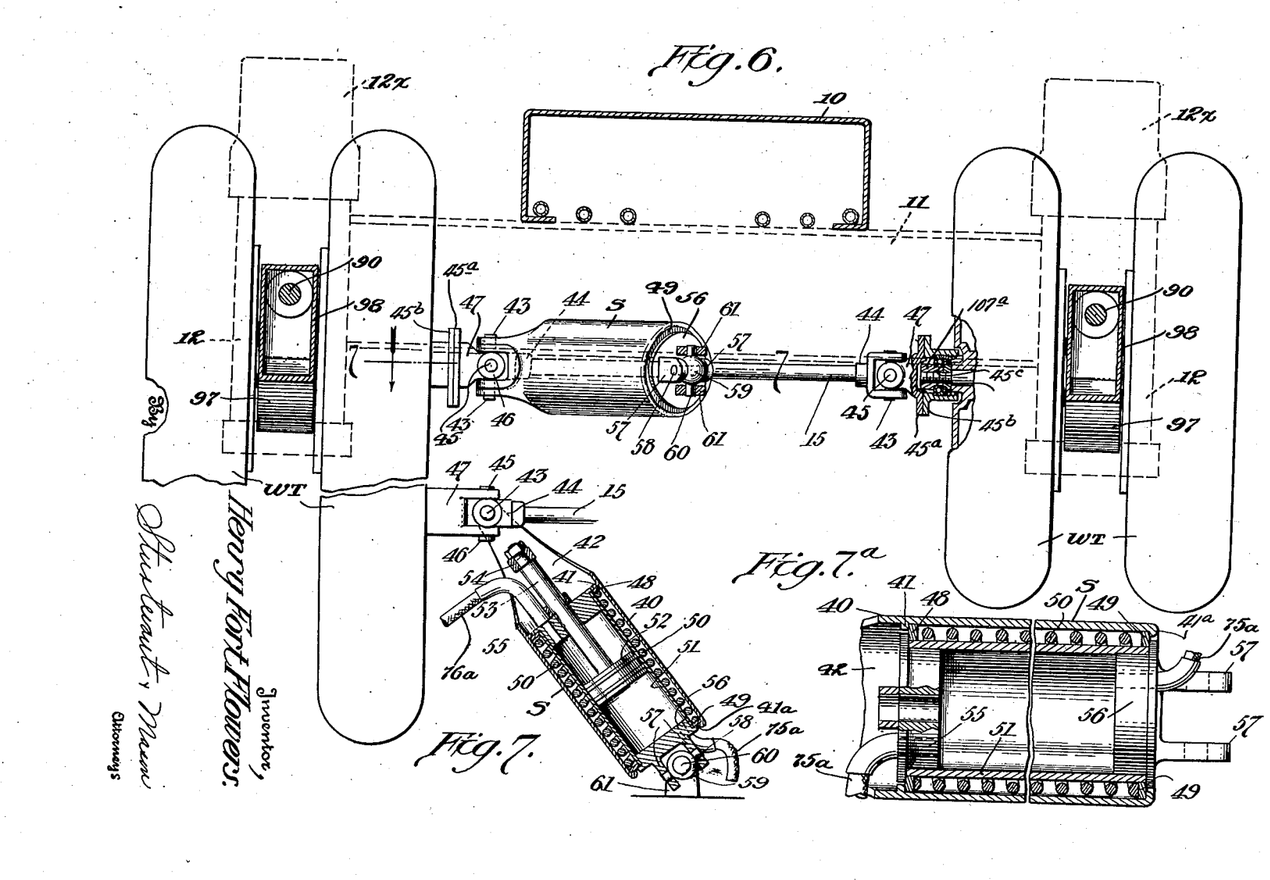
Figure 6 is an end view of the vehicle, with parts omitted for clearness, showing the connection of the steering unit to the trucks, taken substantially on line 6—6 of Figure 5.
Figure 7 is a horizontal section substantially on line 7—7 of Figure 6.
Figure 7a is an enlarged vertical axial section through one of the steering unit cylinders.

It will be seen that when fluid is introduced under pressure into the end of the cylinder adjacent plug 56, and the fluid in the end adjacent the plug 55 is permitted to escape, the pressure of fluid between the plug 56 and the piston 52 causes the latter to move with respect to the sleeve 51 and thus to increase the distance between the centers of pivot pins 43 and 60, and thus causes a rocking of the truck to which the bracket 47 is connected, through an arc about its vertical axis, and therewith produces also a movement of the opposite truck through the corresponding tie rod 15. This movement is accompanied by the engagement of the internal flange 41a operating to move the pressure ring 49 and causing a compression of spring 50, while the pressure ring 48 is being retained against movement by engagement with the plug 55. If the admission of fluid to the cylinder is interrupted, and free exhaust is permitted, the spring 50 will restore the housing 40 and its associated parts including the piston 52 and the truck structure to the centralized or straight-away position for travel. Thus a breakage of the fluid pressure mains for steering control may result only in a straightening of the trucks, and hence will not cause an accident by any sudden departure of the trucks from the straight-away position upon a breakdown, or by producing a greater curvature of path than that existing at the moment of breakdown. If fluid is admitted into the cylinder adjacent the plug 55 and permitted to escape from the end adjacent plug 56, the piston 52 is moved in the opposite direction and causes a reduction of the distance between pivots 43 and 60. Thus the associated trucks are swung in the opposite direction, and steering occurs to the opposite side of a straight-away line. In this case, the other flange 41 engages the pressure ring 48 and causes a compression of spring 50, while the pressure ring 49 bears against the plug 56. Upon release of such pressure, the spring 50 again tends to return all parts to the straight-away position.

The steering of the vehicle system is accomplished in the present illustrative form by the employment of a fluid under pressure, preferably oil, by admitting it to one end of the cylinder of a steering unit, and permitting it to escape from the other. For this purpose, an oil pump 70 (Figures 3, 4 and 5) is driven by the engine E through shaft 70a for delivering fluid under pressure by conduit 71 into a pressure accumulator or storage tank 72 (Figures 3 and 5) from which it may flow by a pressure line 73 to branch pressure lines 74, and thus to the steering control valves VR and VF. The control valve VF controls the direction of actuation of the steering power unit S1 for the front trucks of the tractor vehicle, and the steering control valve VR normally controls the actuation of the steering units S2, S4 or S6, etc., for the rearmost trucks of the vehicle train, i. e., of the tractor or trailer vehicle, accordingly as the tractor is used alone or with one or two, etc., trailers.

When the handle HVL of control valve VF is turned to bring this valve into the position (Figures 3, 3a and 5) for steering the tractor vehicle toward the left (i. e., the position shown in Figures 1, 3 and 5), fluid under pressure is passed from a branch pipe 74 through the valve VF into the steering conduit 75 and by the flexible hose connection 75a into the end of the power unit S1 which is closer to the pivot 60. At the same time, fluid is permitted to escape to the steering conduit 76 through its flexible connection 76a, from the other end of the steering unit S1, and past the valve VF into the exhaust conduit 77 to a sump 78, and back to the pump 70. The steering unit S1 therefore operates by extension to push the rear end of the right-hand front truck Fr of the tractor vehicle away from the central longitudinal vertical plane, and produces a movement of the parts into the position shown in Figures 3 and 5.

Similarly, if the valve VF is turned in the opposite direction (Figure 3b), fluid under pressure will be admitted into the steering conduit 76, and an exhaust permitted to occur through the steering conduit 75, resulting in an opposite steering movement of the trucks and a steering of the vehicle toward the right instead of the left.

If the operator of the vehicle moves the valve VR, fluid under pressure passes from the pressure line 74 through the valve VR into, for example, (Figures 3, 3a and 5) the steering conduit 83, the branch 83a, and through the control valve W2 and the flexible conduit Wb leading to the end of the rear steering unit S2 which is adjacent the corresponding pivot 60. At the same time, the valve VR establishes a return path for fluid under pressure from the other end of the steering unit S2 by the flexible connection Wa, through the control valve W2, by a branch pipe 80a and steering conduit 80 back to the valve VR and thus to the exhaust line 77, and back to the sump 78. With the control valve W2 in this position, the unit S2 extends and causes the rear trucks to swing into the position shown in Figure 5, so that the tractor vehicle (for such illustrative operation) has all four trucks (by the action of the rod 15) swung into position for following on proper arcuate paths about a given center of curvature.

When only the tractor vehicle is employed, the steering conduits 80 and 83 are preferably closed at the rear ends by the shut-off valves 80b and 83b from communication by the flexible connections 80c and 83c with coupling lines 80d and 83d located within the coupling housing 32. When trailer vehicles are coupled in train, the valve W2 is moved to the position of Figure 3e, and valves 80b, 83b are open, so that the movement of fluid as controlled by the valve VR extends to the last trailer through train conduits on each trailer (Figure 1), and similarly actuates the last trucks of the train. In the illustrated form (Figures 1 and 3e), branch pipes 80a and 83a lead from the steering lines 80 and 83 on the trailers to the control valves W3, W4, W5, W6 which are connected by flexible conduits with the steering units S3, S4, S5, S6. Thus, it will be noted, by the positions of the control valves W2, W3, W4, W5, W6, and the connections thereby produced at the power units S2, S3, S4, S5, S6, these units produce steering of the tractor and trailer by moving the first and last pairs of trucks in the train in desired directions: the steering being assisted by the mechanical connection of the intermediate trucks as afforded by the mechanical link members 32 and 35. At the rear end of the last trailer, the steering conduits 80 and 83 are provided with shut-off valves 80b and 83b to prevent loss of fluid adjacent the last steering unit S6 in Figure 1.

Figure 3:
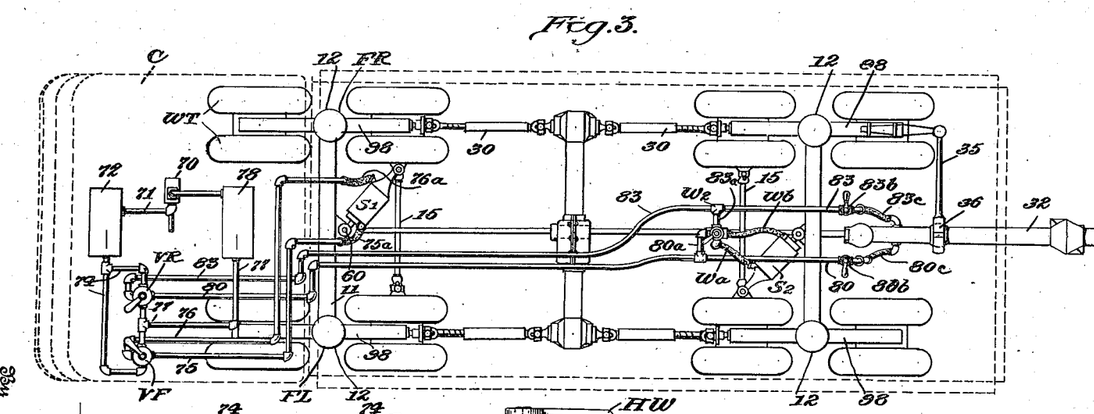
Figure 3 is a diagrammatic plan view, on the same large scale but corresponding to the showing of Figure 1, of the tractor vehicle with the driving and steering connections thereof.
Figures 3A, 3B, 3C, 3D, 3E:
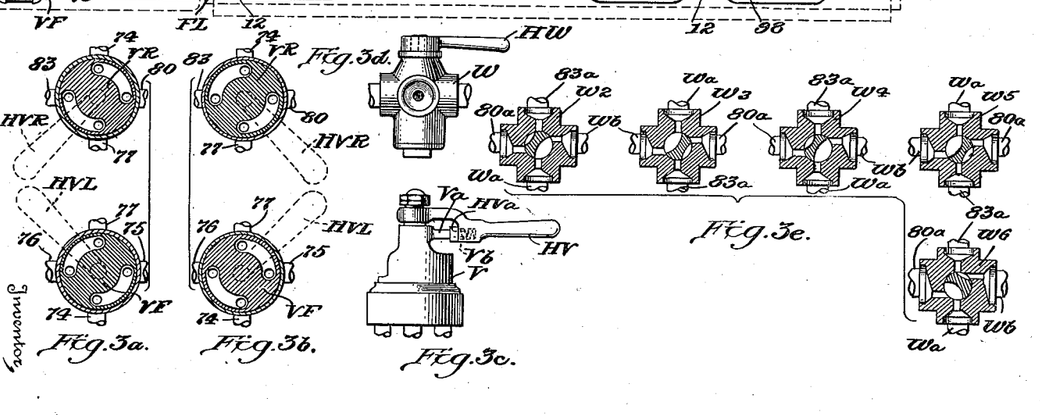
Figures 3a and 3b are diagrammatic views showing the positions of the steering valves corresponding to the turning of the vehicle train to the left and right, the showing of Figure 3a being that of the position of the valves for the steering toward the left as shown in Figure 1.
Figure 3c is a side elevation of one of these valves.
Figure 3d is a side elevation of a change-over valve.
Figure 3e is a diagrammatic view showing in section the change-over valves for the vehicles of Figure 1, in the positions occupied while the vehicles are employed in train.

It will be noted that if the change-over valves are moved to an intermediate position as shown for valves W2, W3, W4, W5 in Figure 3e, in which they prevent the direct passage of fluid between the steering lines 80 and 83 and the corresponding steering units S2, S3, S4, S5, fluid may pass directly from one end of the corresponding unit S2, S3, S4, S5, S6 to the other through the larger ports in these valves: and then the mechanical connections afforded by the members 32 and 35 afford the single and mechanical control for these parts. In such event, the driver can employ the valve VF for steering the front trucks of the tractor and the valve VR for steering the rear trucks of the last trailer by appropriate movements of their handles HVL and HVR, while the rear trucks of the tractor and intermediate trucks of the trailers are mechanically controlled only. This mechanical control, however is assisted, and strain relieved from the associated parts, by the employment of the direct pressure and exhaust connections through the change-over valves W2, W3, W4, W5 when in the position of Figure 3e.

In the illustrated form, each trailer vehicle of the train is shown as competent of movement in either direction through the driving system as aforesaid. Also, it may be coupled to the tractor vehicle either end to, as two couplings 32 are provided, one at either end of the vehicle. Since the trucks are normally turned in opposite directions at the two ends of the vehicle, the simple reversal of connection as provided is sufficient to assure a proper steering of the trucks. Further, if the operator desires to pass over a route which has very sudden and short curves to right and left, a mechanical connecting tie link 35 may be disconnected and the trailer vehicle controlled through the employment of the change-over valves W2, W3, W4, W5, W6 either individually at the vehicle or remotely by actuation of the valve VR.

In the specific illustrative form, the valves VR and VF are identical in construction, but are symmetrically connected to the inlet fluid branch conduits 74 and the exhaust conduits 77. In Figures 3a, 3b and 3c, each of these valves is illustrated as having a body V and a plug member providing valve passages and connected to the handle HV of Figure 3c, corresponding to the handles HVR and HVL of Figures 3a and 3b. This handle is preferably provided with a spring detent member Vb cooperating with a fixed portion Va of the valve body when the handle is in the position in which fluid is neither delivered to or from either of the pairs of pipes 75—76 or 80—83 in the corresponding valve.

Similarly, the change-over valves are illustrated in Figures 3d and 3e as each comprising a body W and a rotatable plug connected with the individual handle HW of the valve. The five change-over valves W2, W3, W4, W5 and W6 of Figure 3e represent the normally selected positions of these valves when the tractor is connected to the two trailer vehicles as in Figure 1. In this arrangement, a larger passage in each of plugs of valves W2, W3, W4 and W5 establishes direct communication with the flexible conduits Wa and Wb for the corresponding steering units S2, S3, S4 and S5 so that fluid may move from one end to the other in each of them; while the smaller passages in the plugs do not permit communication between the steering conduits and their branches 80a and 83a. The change-over valve W6 for the steering unit S6 of the last pair of trucks in the train, however, has its plug displaced through an angle of 90 degrees with respect to the plugs of the corresponding change-over valves W2 and W4 for the steering units S2 and S4 at the rear ends of the tractor and first trailer vehicle, and hence its larger passage establishes communication from the branch supporting conduit 80a to the flexible conduit Wa of the steering unit, while the smaller passage in the plug establishes communication between the branch steering conduit 83a and the flexible conduit Wb of the steering unit S6. The handles HW of these change-over valves may be operated manually as a part of the general operations of coupling two vehicles together, or of uncoupling them.

Figures 8, 9:
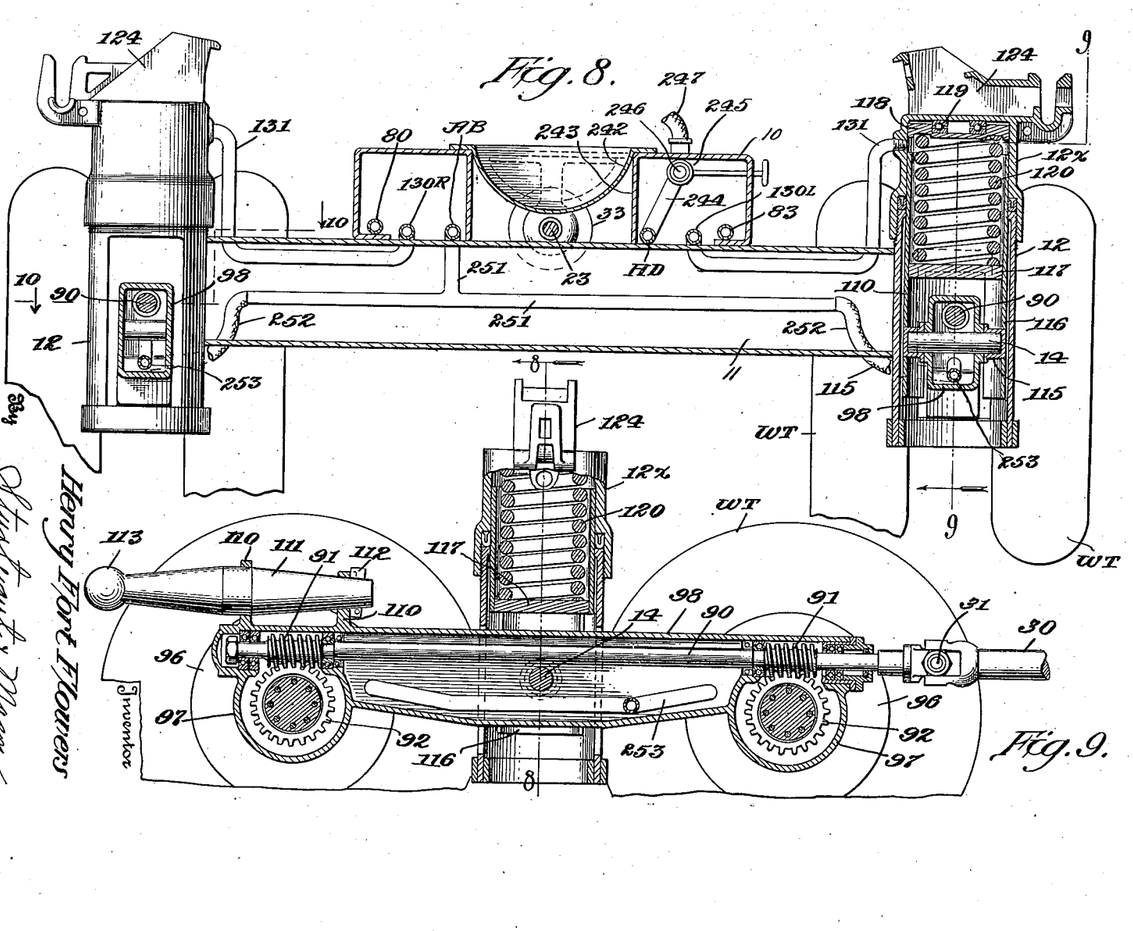
Figure 8 is a transverse upright sectional view substantially on line 8—8 of Figures 2 and 9.
Figure 9 is an upright longitudinal sectional view substantially on line 9—9 of Figure 8.

The telescoping shafts 30 which were stated above to be connected to the individual trucks of the vehicles may be connected as shown in Figures 8 and 9 through the universal joints 31 to the shafts 90 located each within an individual truck frame, and supported by anti-friction bearings and provided with appropriate seals against the escape of lubricant therealong. Each shaft 90 is provided with two worms 91 which are individually in mesh with the worm wheels 92 in the truck.

The end of the truck structure adjacent the end of the truck structure for the right rear truck of the tractor and for the right front and left rear trucks of each trailer vehicle is provided illustratively with upstanding brackets 110 which have apertures to receive the conical pin 111 which is secured fixedly in position by a key 112. The other end of the pin 111 is provided with a ball 113 for cooperation with a mechanical steering link 35 as described above.

Each of the truck bodies is provided with a horizontal shaft 14 on which the truck may rock while its wheels are conforming to unevenness in the terrain. The shaft 14 of each truck is supported by bearing members 115 fixed on the downwardly extending skirt portions 116 of the piston structure which is guided inside the walls of the cushion cylinder 12, which in turn is provided with a cap 12x having at its top a casting structure 124 upon which the body may rest, and with respect to which the body may turn during dumping. It will be understood that suitable latch and door control devices are provided in association therewith, for example of the nature described in my copending application Serial No. 644,733, filed November 28, 1932. The piston structure 116 has a closing plate 117 so that it operates in conjunction with the closed upper end of the cap 12x and the general cylinder 12, as a variable volume fluid-actuated cushioning structure for controlling the relative position of the truck frame 98 with respect to the body. The upper end of the cavity in cap 12x receives a rotatable bearing plate 118 which may swivel upon the bearings 119, and operates as the upper abutment for the lading spring 120 of the corresponding truck, the lower end of the spring 120 abutting against the plate 117. The size of the spring 120 is preferably so selected that while the vehicle is traveling empty, the springs alone are sufficient to afford the proper resilient support to the body, but that when loads are placed upon the body, air may be selectively admitted into the several cylinder and piston arrangements, for example through the conduit 131 for the cylinder shown at the right in Figure 8, to establish an air cushion to assist the corresponding spring. The front and rear faces of the cushion cylinders 12 are cut away to permit freedom of the corresponding truck frame 98 for upward and downward movement relative to the cylinder 12, and also for rocking movement about the axis established by the corresponding shaft 14, and the rocking movement for steering about the vertical axis of the cylinder itself.

The supply of air to the cylinders is preferably effected from an air pump 125 driven from the engine E (Fig. 4), the air being passed through a pipe 126 to a storage tank 127 and thence by a pipe 128 to the cushion control valve 129 by which it may be admitted selectively to the right-hand cushioning air pipe 130R and/or to the left-hand cushioning air pipe 130L, which pass along the length of the tractor vehicle and have branches 131 to the several air cushioning devices. At the rear of the tractor vehicle the pipes 130R and 130L are provided with shut-off valves 132 and the flexible connections 133 to the extensions located in the coupling tube 32 of the corresponding vehicle. The trailer vehicles correspondingly have flexible connections 133 to the shut-off valves 132 and the pipes 130 on such vehicle. It is preferred to employ independent gauges 134 to indicate to the driver the pressures prevailing within the right-hand and left-hand cushioning pipes 130R and 130L (Figure 4).

Each truck frame 98 is thus capable of upward and downward movements relative to its cushioning cylinder 12 and also of rocking movements about the axis 14. Furthermore, the frame 98 and axis 14 may turn together about the vertical axis of the cylinder, the skirt and piston structure 116 then turning within the walls of the cushioning cylinder 12 and its cap 12x, while the spring 120 is free to move by reason of the bearing 119, without the creation of a torsion effect in this spring.

Where the vehicle is employed as a dump vehicle, socket members 242 are provided, preferably at the transverse upright planes of the cross members 11 (Figure 8) to receive the lower balls of, for example, hydraulic lift cylinders of the type described in my Patent No. 1,819,411, granted August 18, 1931. From Figure 8, it will be noted that the frame may be stiffened at such points by cylindrical structures 243. When used as a vehicle having a tilting dump body, with the hydraulic lift, the hydraulic pressure pipe HD may be located in a protected position within the longitudinal frame 10, along with the other conduits, as shown in Figure 8, and is provided with a branch conduit 244 leading to a control valve 245 for the individual vehicle and thus to the hydraulic dumping pipe 246 of such vehicle, with connections by flexible conduits 247 to the individual hydraulic units employed for tilting the body.

When the brakes are operated by fluid, the brake pipe AB may be provided adjacent each cross member 11 with a branch 251 leading to flexible connections 252 which connect with the brake pipes 253 located within the individual truck bodies 98, and thus to the brake cylinders (not shown).

The steering pressure conduits 80c and 83c and the cushioning pressure conduits 133 have been described and shown in respect to Figures 3, 4, 4a and 5 as connected to conduits and contained within the housing 32. Similarly, the hoist conduit HD and the air brake conduit AB for each vehicle are joined by flexible connections.

The structure thus provided enables the operator of the vehicle train, whether composed of one or more vehicles, to move the train forwardly and backwardly by the delivery of energy to each of the wheels therein, together with a power steering by which the wheels may be turned appropriately for passing over the desired route, and to accomplish a control of the cushioning effects at one or both sides of the train.

In particular, it will be noted that the trailer vehicles when disconnected from the motor vehicle may be employed with one pair of trucks fixed by the positioning of the corresponding change-over valve at the position of valve W6, Figure 3e. The change-over valve at the other end of the vehicle may be brought into the position of valves W2, W3, W4, W5 in Figure 3e, and the steering of the trailer can then be effected by manually or otherwise shifting the coupling housing 32 thereof, at the end of the vehicle whose change-over valve is in the position of W6. Further, by placing the change-over valves at both ends of the vehicle in the position of valve W2 in Figure 3e, the trucks at both ends of the vehicle may be swung in any desired manner for steering at both ends of this vehicle, regardless of the direction of travel of the vehicle.

It is obvious that the invention is not limited to the particular embodiment shown, but that it may be employed in many ways within the scope of the appended claims.

Having thus described the invention, what I claim as new and desire to secure by Letters Patent, is:

1. In a steering mechanism for a vehicle having a frame, wheeled means at each end of the frame for supporting the same and each rockable about a corresponding vertical axis, two double-acting fluid-pressure-actuated means each connected for rocking a wheeled means at opposite ends of the frame about the corresponding said axis, a sump for liquid, a pump connected to the sump for placing the liquid under pressure, control valve means for controlling the movement of liquid from said pump and to said sump and comprising two reversible valves, and conduits connecting one said valve to one said actuated means and the other valve to the other actuated means whereby the positioning of the valves will determine the direction and amount of rocking of the associated actuated means.

2. In a steering mechanism for a vehicle having a frame, wheeled means at each end of the frame for supporting the same and each rockable about a corresponding vertical axis, two double-acting fluid-pressure-actuated means each connected for rocking a wheeled means at opposite ends of the frame about the corresponding said axis, a sump for liquid, a pump connected to the sump for placing the liquid under pressure, control valve means for controlling the movement of liquid from said pump and to said sump and comprising two reversible valves, conduits connecting one said valve to one said actuated means and the other valve to the other actuated means whereby the positioning of the valves will determine the direction and amount of rocking of the associated actuated means, and further valve means for preventing movement of liquid between said conduits and one said actuated means.

3. In a steering mechanism for a vehicle having a frame and wheeled means supporting the frame and rockable about a vertical axis for steering, a double-action actuating power unit for rocking said wheeled means in either direction about said axis relative to the frame and including two relatively movable parts, one of said parts being connected to the frame and the other to the wheeled means, each said part having a pair of opposed abutments similarly spaced apart in the direction of the relative movement, a spring located between said abutments so that the relative movement in either direction causes one abutment on one part and the opposed abutment on the other part to operate for compressing said spring so that the spring may operate to assist the relative return of the parts, and power means for selectively effecting relative movements of the said parts in a selected direction.

4. In a steering mechanism for a vehicle having a frame and wheeled means supporting the frame and rockable about a vertical axis, a double-action power unit including a cylinder member and a piston member, one said member being connected to the frame and the other to said wheeled means, a sleeve surrounding the cylinder and connected to the piston, a spring in the annular space between the cylinder and the sleeve, a pair of axially spaced outwardly extending abutment means on the cylinder, a pair of axially spaced inwardly extending abutment means on the sleeve, the abutment means in each said pair being spaced apart in the direction of the relative movement by a distance which is substantially identical in the two pairs, abutment rings at the ends of the spring for selective engagement by said abutment means so that the relative movement of the cylinder member and sleeve in either direction will cause an abutment toward one end of the cylinder member and an abutment toward the other end of the sleeve to engage the respective abutment rings and thereby produce a compression of the spring, and fluid pressure means for selectively moving the cylinder and piston members relative to one another.

5. In a steering mechanism for a vehicle having a frame and a pair of wheeled means located at the ends thereof and rockable about individual vertical axes, individual fluid pressure actuated means connected for causing rocking movements of the wheeled means, a source of fluid under pressure, individual control valves, conduits connecting said source and valves, further conduits connecting the valves and actuated means for selectively delivering fluid to said actuating means, said valves and conduits being independent for permitting conjoint or separate actuation of the actuated means, and a change-over valve connected to said conduits and to one of said actuated means for controlling the flow of fluid between said conduits and said one actuated means, said change-over valve being constructed and arranged to be effective in one position to cause the flow of fluid to and from said actuated means when the said conduits are selectively charged with fluid, and being effective in another position to shut off the flow of fluid between said one actuated means and said conduits and to establish a passage for flow of fluid between portions of said one actuated means for permitting a free rocking movement of the corresponding wheeled means independent of the movement of fluid in said conduits.

6. In a steering mechanism for a vehicle, a frame, wheeled means supporting the frame, at least one said wheeled means comprising a truck structure having transverse wheel supporting axes spaced apart in the direction of length of the vehicle, supporting means for associating the frame and said one wheeled means and comprising horizontal pivot means for permitting the wheel axes to move up and down relative to the frame and to one another and a vertical axis about which the truck may be rocked for steering, double-action fluid pressure actuated means having two relatively movable parts, universal connections between one said part and the frame, universal connections between the other said part and said wheeled means at a point longitudinally spaced from said horizontal pivot means and said vertical axis, conduit means including flexible portions in communication with said actuated means, a source of fluid under pressure, and control valve means for selectively establishing communication between said source and conduits.

7. In a steering mechanism for a vehicle, a frame, wheeled means supporting the frame, at least one said wheeled means comprising a truck structure having transverse wheel supporting axes spaced apart in the direction of length of the vehicle, supporting means for associating the frame and said one wheeled means and comprising horizontal pivot means for permitting the wheel axes to move up and down relative to the frame and to one another and a vertical axis about which the truck may be rocked for steering, double-action fluid pressure actuated means having two relatively movable parts, universal connections between one said part and the frame, universal connections between the other said part and said wheeled means at a point longitudinally spaced from said horizontal pivot means and said vertical axis, conduit means including flexible portions in communication with said actuated means, a source of fluid under pressure, control valve means for selectively establishing communication between said source and conduits, and means for restoring said actuating means to a central normal position upon breaking of the conduit means.

8. In a steering mechanism for a vehicle having a frame, a plurality of wheeled means supporting said frame and each rockable about a corresponding vertical axis, individual fluid-pressure-actuated means connected to associated wheeled means for causing rocking movements thereof about such axis thereof, a source of fluid under pressure, control valve means for controlling the movement of fluid from said source, conduits connecting said control valve means and said fluid-pressure actuated means whereby the control valve means may selectively effect movement of said fluid-pressure actuated means, and further valve means for preventing movement of fluid from said conduits to one said fluid-pressure actuated means and for establishing direct fluid communication between parts of said one fluid-pressure actuated means for permitting free movement thereof.

9. In a steering mechanism for a vehicle having a frame, wheeled means supporting said frame and rockable about a vertical axis, a sump, a double-acting fluid-pressure-actuated means for causing rocking movements of the wheeled means, a sump for liquid, a pump connected for placing the liquid from the sump under pressure, reversible control valve means, and conduit means connecting said pump, sump and valve means and said fluid-pressure actuated means, said conduit means including two conduits extending to the fluid-pressure actuated means and operating when said valve means is in one position to effect delivery of liquid under pressure to said fluid-pressure actuated means through one said conduit and the escape of liquid from said fluid-pressure actuated means through the other conduit to said sump for provoking a rocking of the wheeled means in one direction, and operating when the valve means is in another position for reversing the relative directions of flow in said conduits and provoking a rocking of the wheeled means in the other direction.

10. In a steering mechanism for a vehicle having a frame and a pair of wheeled means located at the ends thereof and rockable about individual vertical axes, individual fluid pressure actuated means connected for causing rocking movements of the wheeled means and each including selectively energizable cylinder portions, a source of fluid under pressure, individual control valves, and conduits connecting said source and valves, further conduits individually connecting the valves and said fluid-pressure actuated means for selectively delivering fluid to said fluid-pressure-actuated means, said valves and conduits being independent for permitting conjoint or separate actuation of the said fluid-pressure actuated means, and a valve which in one position establishes communication between the conduits and the cylinder portions of the corresponding fluid-pressure-actuated means for energization thereof under control of the corresponding individual control valve and in another position establishes direct fluid communication between the latter cylinder portions and closes communication of at least one said portion with said further conduits whereby to permit free movement of corresponding wheeled means.

HENRY FORT FLOWERS.